United States Patent
Ully

(10) Patent No.: US 6,928,164 B1
(45) Date of Patent: Aug. 9, 2005

(54) DATA PROCESSING DEVICE WITH DATA PROCESSING MEANS UTILIZING A CHARACTERISTICS VALUE AND WITH MEANS FOR COUNTERACTING ANALYSIS METHODS FOR THE DETECTION OF THE CHARACTERISTIC VALUE

(75) Inventor: Klaus Ully, Deutschlandsberg (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/365,211

(22) Filed: Jul. 30, 1999

(30) Foreign Application Priority Data

Jul. 31, 1998 (EP) .............................................. 98890222

(51) Int. Cl.[7] .............................. H04L 9/00; H04N 7/167
(52) U.S. Cl. ......................... 380/44; 713/200; 713/194
(58) Field of Search ............................. 380/35, 44, 46, 380/218, 219, 238, 239; 713/200–201, 194; 709/223–226, 229

(56) References Cited

U.S. PATENT DOCUMENTS 6,745,254 B2 * 6/2004 Boggs et al. .................. 710/11
6,745,331 B1 * 6/2004 Silverbrook ................. 713/200

FOREIGN PATENT DOCUMENTS

| EP | 0448262 A2 | 9/1991 | ............. G06F/1/00 |
| WO | WO9733217 | 9/1997 | ............. G06F/1/04 |

OTHER PUBLICATIONS

Van, May 25, 1992, Computing Canada, v18, n11, p1(2).*

* cited by examiner

Primary Examiner—Gilberto Barrón
Assistant Examiner—Jenise Jackson
(74) Attorney, Agent, or Firm—Kevin Simons

(57) ABSTRACT

A data processing device (1) which includes a circuit (2) with data processing means (17) which are suitable for processing data (DA) while utilizing a characteristic value (CV) and with sequencing means (15) which are arranged to execute an algorithm in order to control the data processing means (17) in conformity with this algorithm which comprises a given number N of sub-algorithms containing identical successions of algorithm steps, is additionally provided with order fixation means (29) which co-operate with the sequencing means (15) and whereby, each time when the algorithm is executed, an order can be fixed from a plurality of feasible orders for the execution of the N sub-algorithms.

14 Claims, 2 Drawing Sheets

US 6,928,164 B1

DATA PROCESSING DEVICE WITH DATA PROCESSING MEANS UTILIZING A CHARACTERISTICS VALUE AND WITH MEANS FOR COUNTERACTING ANALYSIS METHODS FOR THE DETECTION OF THE CHARACTERISTIC VALUE

BACKGROUND OF THE INVENTION

The invention relates to a data processing device which includes a circuit which consists of various circuit sections which can be fed with a supply voltage via a configuration of conductors, and includes data processing means which constitute such a circuit section that can be fed with the supply voltage and are arranged to process data while utilizing a characteristic value, and also includes sequencing means which also constitute such a circuit section that can be fed with the supply voltage and are arranged to execute an algorithm in order to control the data processing means in conformity with this algorithm, which algorithm comprises a given number N of sub-algorithms which contain identical sequences of algorithm steps and can be executed in a given order each time when the algorithm is executed, and wherein, upon processing of data by means of the data processing means under the control of the sequencing means in conformity with the algorithm, the data processing causes a current peak pattern to occur at the area of the configuration of conductors, the pattern configuration of the current peak pattern being dependent on the algorithm steps, on the processed data and on the characteristic value.

The invention also relates to a circuit for a data processing device which consists of various circuit sections which can be fed with a supply voltage via a configuration of conductors and includes data processing means which constitute such a circuit section that can be fed with the supply voltage and are arranged to process data while utilizing a characteristic value, and also includes sequencing means which also constitute such a circuit section that can be fed with the supply voltage and are arranged to execute an algorithm in order to control the data processing means in conformity with this algorithm, which algorithm comprises a given number N of sub-algorithms which contain identical sequences of algorithm steps and can be executed in a given order each time when the algorithm is executed, and wherein, upon processing of data by means of the data processing means under the control of the sequencing means in conformity with the algorithm, the data processing causes a current peak pattern to occur at the area of the configuration of conductors, the pattern configuration of the current peak pattern being dependent on the algorithm steps, on the processed data and on the characteristic value.

A data processing device of the kind set forth in the first paragraph and a circuit of the kind set forth in the second paragraph are known notably from the contact-type chip cards which are used in a variety of versions and include an integrated component developed and marketed by Applicant. In the known data processing device, so in the known contact-type chip card, and in the known circuit, so in the integrated component included in such a known contact-type chip card, the data processing means are formed by encryption means which perform, in conformity with the "Data Encryption Standard" (DES), an encryption operation on data applied thereto while utilizing a characteristic value which is also applied thereto, that is to say a secret key. During such an encryption operation overall N=8 so-called SBOX units are executed, an SBOX result being calculated by means of each SBOX unit. All eight SBOX units are executed within the framework of a program which constitutes an algorithm and each program block of which forms a sub-algorithm and corresponds to an SBOX unit. Each program block, corresponding to an SBOX unit, contains a table which is characteristic of the relevant SBOX unit and contains entries, the entries of all SBOX units being different. The table contained in an SBOX unit, or the entries in this table, is used to determine output data associated with the input data applied to an SBOX unit. Such determination of output data associated with input data, however, is performed while utilizing the same algorithm for the linking of input data and output data in all eight SBOX units; this means that each of the N program blocks, representing a respective SBOX unit and constituting a respective sub-algorithm, contains identical sequences of program instructions as algorithm steps. In the known data processing device, or the known circuit, the N program blocks are invariably executed in the same order each time when the program is executed.

During execution of an encryption operation a current peak pattern occurs at the area of the configuration of conductors, which peak pattern is dependent on the program instructions, on the data processed in the encryption means and on the characteristic value used in the encryption means, so on the secret key for these encryption means. In the known data processing device, or in the known circuit, a problem is encountered in that the respective current peak patterns thus caused also occur in parts of the circuit, or parts of the data processing device, which can be externally interrogated. The occurrence of the respective current peak patterns each time caused in said parts can be used, for example, to supply the data processing means for the processing of data while utilizing a characteristic value with given known data an arbitrary number of times in succession in order to carry out processing, and to subject the current peak pattern thus produced, always being the same, during the processing of this known data, to observation or detection, so that information concerning the characteristic value, so the secret key, used in the data processing means, so the encryption means, can be extracted from the detected current peak pattern while using rather complex correlation methods or comparison methods which, however, are known and available. Evidently, such cracking of a secret key is undesirable, because the desired secrecy can then no longer be reliably ensured.

SUMMARY OF THE INVENTION

It is an object of the invention to avoid the described problems and to provide, while using simple means and only very little additional work, an improved data processing device, or an improved circuit for a data processing device, which ensures a high degree of reliability in respect of keeping a characteristic value secret.

In order to achieve the described object, a data processing device of the kind set forth in the first paragraph according to the invention is characterized in that the circuit additionally includes order fixation means which co-operate with the sequencing means and whereby, upon each execution of the algorithm, an order can be fixed from a plurality of feasible orders for the execution of the N sub-algorithms.

In order to achieve the described object, furthermore, a circuit of the kind set forth in the second paragraph according to the invention is characterized in that the circuit additionally includes order fixation means which cooperate with the sequencing means and whereby, for each execution of the algorithm, an order can be fixed from a plurality of feasible orders for the execution of the N sub-algorithms.

By taking the steps according to the invention, it is very simply and reliably achieved that even though the succession of all algorithm steps of all successively executed sub-algorithms is always the same for each execution of the algorithm, the order for the execution of the N sub-algorithms of an algorithm is different for each execution of the algorithm, so that the order of the execution of the N sub-algorithms cannot be determined from outside the data processing device or the circuit of the data processing device. Therefore, it is also impossible to compare successively produced current peak patterns, caused by successive activation of the algorithm, in order to use these peak patterns for analysis by means of correlation methods or comparison methods. Undesirable recognition or detection of a characteristic value used in the data processing means, such as a secret key, thus becomes practically impossible or at least drastically more difficult.

The steps disclosed in the claims 2 and 3 or 7 and 8 have proven to be very effective for data processing according to the invention, or for a circuit according to the invention, because these embodiments are characterized by a pronounced simplicity and can be readily implemented while using means already present in a data processing device according to the invention or a circuit according to the invention. As regards the order selection means it is to be noted that these order selection means preferably contain only a part of all feasible orders for the execution of the N algorithms, but that it is also simply possible to provide the order selection means with all feasible orders for the execution of N sub-algorithms.

It has been found that the steps according to the invention are particularly advantageously taken in a data processing device in conformity with Claim 4 or a circuit as, claimed in Claim 9, because there is a very pronounced need for secrecy as regards the key used notably in the case of means for the encryption and/or decryption of data.

A data processing device according to the invention may be formed, for example by a computer or a personal computer arranged, for example to execute an encryption program. The steps according to the invention have proved to be very attractive notably for a data processing device as disclosed in Claim 7 or in a circuit as disclosed in Claim 14, because the risk of cracking of a characteristic value is particularly high in these cases.

These and other aspects of the invention will become apparent from the embodiment described hereinafter.

BRIEF DESCRIPTION OF THE DRAWINGS

The invention will be described in detail hereinafter with reference to an embodiment as shown in the drawings, however, without the invention being restricted thereto.

DETAILED DESCRIPTION OF THE PREFERRED EMBODIMENTS

Figure 1:
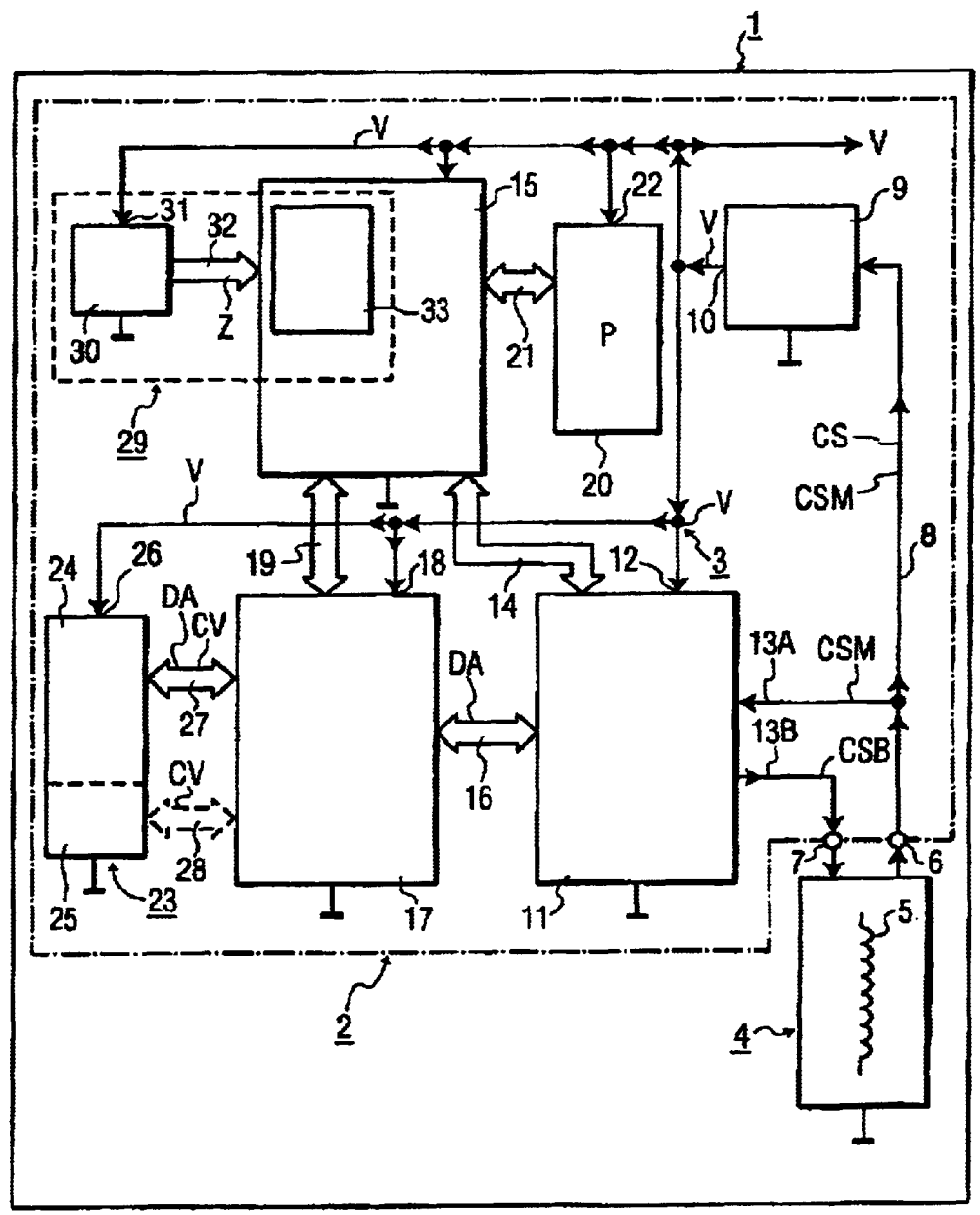
FIG. 1 shows a block diagram of an in this context essential part of a data processing device and a circuit for this data processing device in a first embodiment of the invention.

FIG. 1 shows a block diagram of a part of a data processing device which is in this case formed by a data carrier 1 which is constructed for contactless communication with a write/read station which is provided for this purpose but not shown in FIG. 1.

The data carrier 1 includes a circuit 2 which is realized in integrated technology. The circuit 2 consists of a plurality of circuit sections which will be described in detail hereinafter. The circuit sections can be supplied with a supply voltage V via a configuration of conductors 3, said supply voltage being a DC supply voltage. The generating of the supply voltage V will also be described in detail hereinafter.

The data carrier 1 includes transmitter/receiver means 4 which include a transmitter coil 5. The receiver/transmitter means 4 are connected to a first connection 6 and to a second connection 7 of the circuit 2. The transmitter coil 5 can be inductively coupled to a transmitter coil of a write/read station not shown. These two transmitter coils enable a nonmodulated carrier signal CS as well as an amplitude modulated carrier signal CSM, being amplitude modulated in conformity with data DA to be transmitted from the write/read station to the data carrier 1, as well as a load modulated carrier signal CSB, which can be generated by means of load modulation means (not shown in FIG. 1) of the data carrier 1, or the circuit 2 of this data carrier 1, and whereby data to be transmitted from the data carrier 1 to a write/read station can be transmitted, to be transmitted between the two communicating partners, so a write/read station and the data carrier 1. The foregoing are facilities which have since long been known.

The supply voltage V can be obtained in the data carrier 1 by means of the nonmodulated carrier signal CS transmitted from a write/read station to the data carrier 1 and by means of the amplitude modulated carrier signal CSM transmitted from a write/read station to the data carrier 1. To this end, the non-modulated carrier signal CS received by the receiver/transmitter means 4 and the amplitude modulated carrier signal CSM are applied, via the first connection 6 and an electrically conductive connection 8 connected to the first connection 6, to supply voltage generating means 9. The supply voltage generating means 9 essentially consist of a rectifier stage and a storage capacitor as well as voltage-limiting means which prevent an undesirable overvoltage. The supply voltage generating means 9 are capable of generating the already mentioned supply voltage V which can be output to the configuration of conductors 3 via an output 10 of the supply voltage generating means 9. The generated supply voltage V can be applied to the various circuit sections of the circuit 2 via the configuration of conductors 3. It is to be noted that this configuration of conductors 3 also includes conductive ground connections which, however, have been omitted in FIG. 1 for the sake of simplicity.

The data carrier 1, or the circuit 2, includes first data processing means 11 which can be supplied with the supply voltage V via a supply input 12. Furthermore, via a connection 13A the first data processing means 11 can also be supplied with the amplitude modulated carrier signal CSM output by the receiver/transmitter means 4. The load modulated carrier signal CSB can be obtained in the receiver/transmitter means 4 by way of the first data processing means 11, via a further connection 13B which is connected to the second connection 7. Furthermore, a first BUS connection 14, connected to sequencing means 15, is connected to the first data processing means 11. The sequencing means 15 are arranged to execute a first algorithm in order to control the first data processing means 11 in conformity with this first algorithm.

The first data processing means 11 include demodulation means (not shown) whereby the applied amplitude modulated carrier signal CSM can be demodulated. After such demodulation of the amplitude modulated carrier signal CSM, if necessary, the demodulated signal can be decoded. If desired, further processing operations may also be performed. After the execution of all processing operations, the first data processing means 11 output data DA via a second BUS connection 16 which is connected to second data processing means 17.

The second data processing means 17 are arranged to process data DA while using a characteristic value CV. In the present case the second data processing means 17 are formed by means for the encryption and/or decryption of data, the secret key required for the encryption and decryption being formed by the previously mentioned characteristic value CV.

The second data processing means 17 include a supply input 18 via which the second data processing means 17 can be supplied with the supply voltage V. Furthermore, a third BUS connection 19 is connected to the second data processing means 17, the other end of said bus connection being connected to the sequencing means 15. The sequencing means 15 are also arranged to execute a second algorithm in order to control the second data processing means 17 in conformity with this second algorithm.

In the present embodiment of the data carrier 1 of FIG. 1 the circuit 2 includes program storage means 20 which co-operate with the sequencing means 15 and in which the second algorithm is stored in the form of a program P. The second algorithm, so the program P, contains a given number N of sub-algorithms which are in this case formed by N program blocks PB1, PB2, PB3 . . . PBN. The sub-algorithms, formed by the program blocks PB1 to PBN, contain identical successions of algorithm steps which are formed by program instructions CO1, C02, C03 . . . COR in the present case. The N sub-algorithms, so the N program blocks, can be executed in a given order during each execution of the algorithm, so of the program P, as will be described in detail hereinafter. The program storage means 20 are connected, via a fourth BUS connection 21, to the sequencing means 15 so that co-operation between the program storage means 20 and the sequencing means 15 is possible via the fourth BUS connection 21. The program storage means 20 include a supply input 22 via which the supply voltage V can be applied to the program storage means 20.

The circuit 2 also includes storage means 23 which comprise a data storage section 24 and a characteristic value storage section 25. The data storage section 24 is arranged to store data DA. The characteristic value storage section 25 is arranged to store a characteristic value CV. The storage means 23 include a supply input 26 via which the supply voltage V can be applied to the storage means 23. A fifth BUS connection 27 is connected to the storage means 23, the other end of said BUS connection being connected to the second data processing means 17. Bi-directional transport of data between the second data processing means 17 and the storage means 23 and transport of the characteristic value CV from the storage means 23 to the second data processing means 17 can take place via the fifth BUS connection 27. As is denoted by dashed lines in FIG. 1, a separate BUS connection 28 may be provided between the characteristic value storage section 25 and the second data processing means 17, said separate BUS connection enabling an exchange of at least a characteristic value CV between the characteristic value storage section 25 and the second data processing means 17.

Data DA applied from the first data processing means 11 to the second data processing means 17, via the second BUS connection 16, can be encrypted in the course of an encryption operation in the second data processing means 17. In the case of such an encryption operation, the encrypted data DA produced is applied, via the fifth BUS connection 27, to the data storage section 24 of the storage means 23 so as to be stored therein.

Data DA which is applied to the second data processing means 17, via the bus connection 27, and read from the data storage section 24 of the storage means 23 can be encrypted during a further encryption operation in the second data processing means 17; the encrypted data DA, can then be applied, via the second BUS connection 16, to the first data processing means 11 in which the encrypted data DA is further processed, after which, finally, load modulation is performed, via the connection 13B, in conformity with the encrypted data DA, thus yielding the load modulated carrier signal CSB in the receiver/transmitter means 4.

The sequencing means 15 provide control of the second data processing means 17 during the execution of such encryption operations, that is to say essentially in such a manner that the sequencing means 15 successively read the program instructions CO1, C02 etc., via the fourth BUS connection 21, from the program P stored in the program storage means 20, after which a processing step, corresponding to the respective read program instruction, is executed in the second data processing means 17. During such processing of data DA by means of the second data processing means 17, under the control of the sequencing means 15 in conformity with the program P stored in the program storage means 20, a current peak pattern occurs at the area of the configuration of conductors 3 due to the data processing. The pattern configuration of the current peak pattern is then dependent on the program instructions CO1, C02 . . . COR, on the processed data DA, and on the characteristic value CV.

The data carrier 1, or the circuit 2, is preferably constructed in such a manner that the circuit 2 includes additional order fixation means 29 which co-operate with the sequencing means 15 and whereby, upon each execution of the algorithm formed by the program stored in the program storage means 20, an order can be fixed from a plurality of feasible orders for the execution of the N sub-algorithms, so the N program blocks PB1, PB2 . . . PBN.

In the present embodiment the order fixation means 29 include a random number generator 30. The random number generator 30 includes a supply input 31 via which the supply voltage V can be applied to the random number generator 30. The random number generator 30 is connected to the sequencing means 15, via a sixth BUS connection 32. Each random number Z generated by the random number generator 30 can thus be applied to the sequencing means 15 via the sixth BUS connection 32. The order fixation means 29, including the random number generator 30, are capable of fixing, upon each execution of the program P stored in the program storage means 20, an order which is determined by the random number Z generated by the random number generator 30 and is used for the execution of the N program blocks PB1 to PBN of the program P.

To this end, the order fixation means 29 additionally include order selection means 33 which are included in the sequencing means 15. The order selection means 33 contain feasible orders for the execution of the N program blocks PB1 to PBN of the program P. Preferably, the order selection means 33 contain only a part of all feasible orders. The order selection means 33 co-operate with the random number generator 30, that is to say in such a manner that the order selection means 33 can select an order from the feasible orders, contained in the order selection means 33, in conformity with the random number Z which is received from the random number generator 30 via the sixth BUS connection 32.

The first data processing means 11, the sequencing means 15, the second data processing means 17, the program storage means 20, the storage means 23 and the random number generator 30 constitute a respective circuit section of the circuit 2, which circuit sections can be supplied with the supply voltage V via the configuration of conductors 3.

The operation of the data carrier 1 and the circuit 2, respectively, in respect of the processing of data DA by means of the second data processing means 17 and under the control of the sequencing means 15 in conformity with the program P will be described in detail hereinafter with reference to the program blocks PB1 to PBN in FIG. 2.

Figure 2:
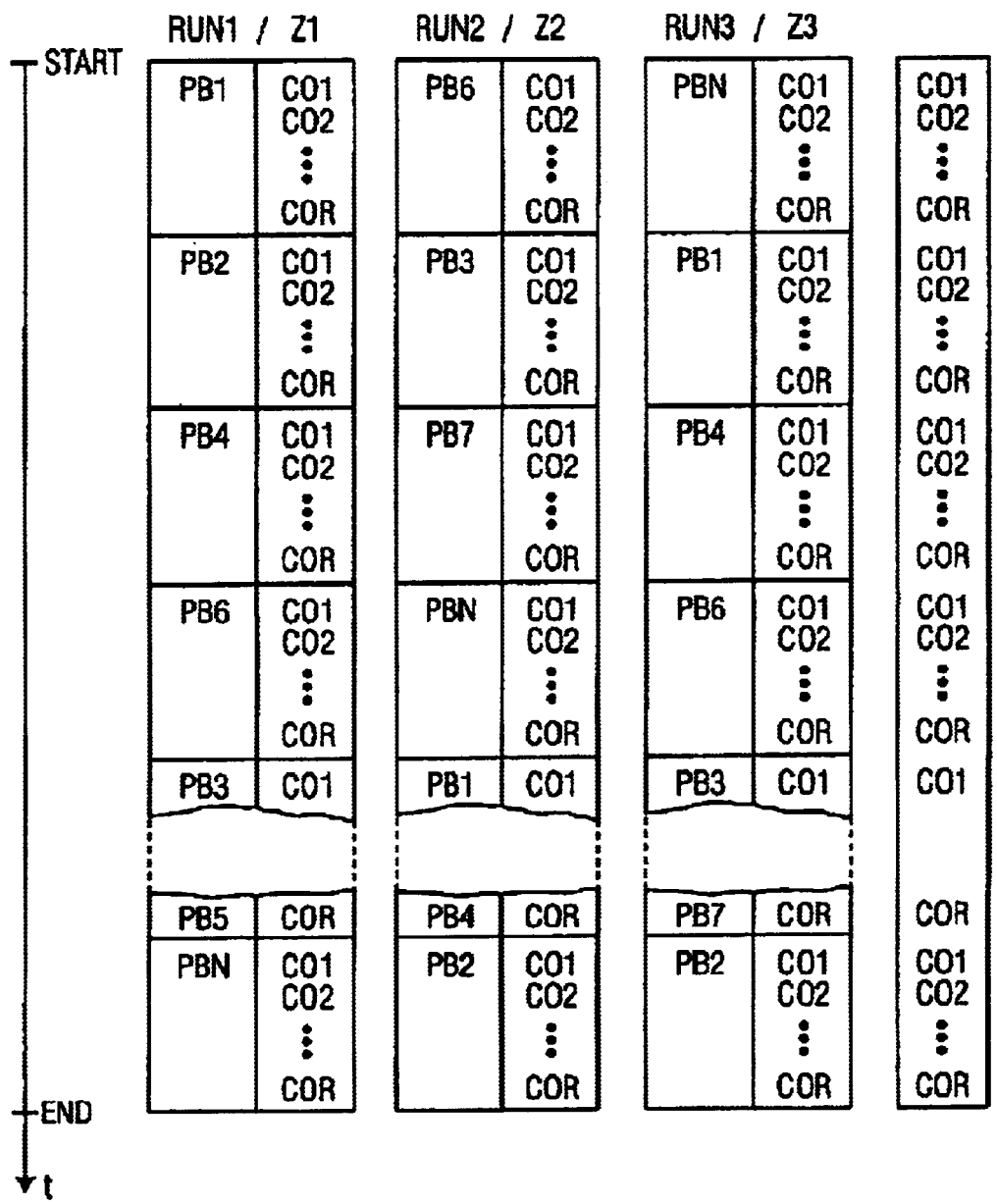
FIG. 2 shows diagrammatically three executions of one and the same program which consists of a total of N program blocks.

It is assumed that in the course of a data processing operation in the data carrier 1, or by means of the circuit 2 of the data carrier 1, the second data processing means 17, being arranged to process data DA while using the characteristic value CV, are successively activated for three data processing cycles which are denoted by the references RUN1, RUN2 and RUN3 in FIG. 2. Before the first data processing cycle RUN1 of the second data processing means 17 is reached in the course of such a data processing operation, the random number generator 30 is activated in a manner not described, after which the random number generator 30 generates a random number Z1 which is applied to the order selection means 33 via the sixth BUS connection 32. The order selection means 33 then select, in conformity with the random number Z1 received from the random number generator 30, an order for the execution of the N program blocks PB1 to PBN of the program P, for example the order PB1, PB2, PB4, PB6, PB3, . . . PB5 and PBN shown in the left-hand column in FIG. 2. Subsequently, the program blocks PB13 to PBN are executed in the described order. All program instructions CO1, CO2, . . . COR, CO1, CO2, . . . COR etc. until CO1, CO2 . . . COR contained in said program blocks are executed; this means that the successive program instructions CO1, CO2 to COR overall are executed N times in succession as indicated in the right-hand column of FIG. 2.

When the second data processing cycle RUN2 is to be executed during the data processing operation, first the random number generator 30 is activated again, with the result that the random number generator 30 outputs a second random number Z2. The second random number Z2 is applied, via the sixth BUS connection 32, to the order selection means 33 so that the order selection means select a further order, for example the order PB6, PB3, PB7, PBN, PB1, . . . PB4 and PB2 shown in the second column of FIG. 2. Thus, the second data processing cycle RUN2 involves a completely different order for the execution of the N program blocks. The order of the program instructions CO1, CO2 to COR etc., however, remains the same.

When the third data processing cycle RUN3 is to be executed in the course of the assumed data processing operation, the random number generator 30 is activated again in the same way as described above, so that the generator generates the random number Z3 and applies it, via the sixth BUS connection 32, to the sequencing means 15 or the order selection means 33 included therein. Consequently, the order selection means 33 select a further order for the execution of the N program blocks PB1 to PBN, for example the order PBN, PB1, PB4, PB6, PB3, . . . PB7 and PB2 shown in the third column of FIG. 2. The third data processing cycle RUN3 thus involves a new order again for the execution of the N program blocks PB1 to PBN of the program P, the order of the program instructions CO1, CO2 to COR etc., however, again being the same.

As will be evident from the foregoing description, for the data carrier 1 shown in FIG. 1, or for the circuit 2 of the data carrier 1, it is achieved that, even though the order of all program instructions COX of all successively executed program blocks PBX is always the same upon each execution of the program P, the order for the execution of the N program blocks PBX of the program P is different during each execution of this program. It is thus achieved that the order of the execution of the N program blocks PBX cannot be detected from outside the data carrier 1 or the circuit 2 of the data carrier 1. Consequently, it is also impossible to compare successive orders of current peak patterns, caused by successive activation of the program P, in order to use such orders for analysis utilizing correlation methods, or to use the order of occurrence of the N current peak patterns, one of which occurs upon each execution of a program block PBX, for comparison methods. It is thus achieved that undesirable detection or recognition of the characteristic value CV used in the second data processing means 17 is practically impossible.

A further embodiment of data carrier (not shown) is provided with a wired logic circuit instead of the program storage means 20; this wired logic circuit co-operates with the sequencing means 15 and contains a wired algorithm, i.e. a hardware algorithm. This algorithm, stored hardware-wise in the wired logic circuit, enables analogous control of the second data processing means 17 by means of the sequencing means 15.

The invention is not restricted to the data processing device, so the data carrier 1, in the embodiment shown in and described with reference to FIG. 1. In the data carrier 1 shown in FIG. 1 the order selection means 33 are constructed so as to form part of the sequencing means 15, the order selection means 33 being realized in hardware. In a further embodiment of a data processing according to the invention (not shown) the order selection means 33 may also be implemented by means of a selection program, said selection program forming part of the program P stored in the program storage means 20. The random number generator 30 then co-operates directly, via a BUS connection, with the second data processing means 17. It is also to be noted that in the case of the data carrier 1 shown in FIG. 1 the program P stored in the program storage means 20 forms a part of a larger program. As regards the succession of the program blocks PB1 to PBN as shown in FIG. 2 it is to be noted that the program blocks need not necessarily be executed in direct succession; it is also possible to execute a part of another program between the execution of two successive program blocks PB.

What is claimed is:

1. A date processing device which includes a circuit which consists of various circuit sections which can be fed with supply voltage via a configuration of conductors, and includes data processing means which constitute such a circuit section that can be fed with the supply voltage and are arranged to process data while utilizing a characteristic value, and also includes sequencing means which also constitute such a circuit section that can be fed with the supply voltage and are arranged to execute an algorithm in order to control the data processing means in conformity with this algorithm, which algorithm comprises a given number N of sub-algorithms which contain identical sequences of algorithm steps and can be executed in a given order each time when the algorithm is executed, and wherein, upon processing of data by means of the data processing means under the control of the sequencing means in conformity with the algorithm, the data processing causes a current peak pattern to occur at the area of the configuration of conductors, the pattern configuration of the current peak pattern being dependent on the algorithm steps, an the process data and on the characteristic value, characterized in that the circuit additionally includes order fixation means which co-operate with the sequencing means and whereby, upon each execution of the algorithm, an order can be fixed from a plurality of feasible orders for the execution of the N sub-algorithms.

2. A data processing device as claimed in claim 1, characterized in that the order fixation means include a random number generator, and that, by means of the order fixation means upon each execution of the algorithm, an order for the execution of the N sub-algorithms is fixed, said order being defined by a random number generated by the random number generator.

3. A data processing device as claimed in claim 2, characterized in that the order fixation means additionally include order selection means which contain feasible orders for the execution of the N sub-algorithms and co-operate with the random number generator, and that the order selection means can select an order from the feasible orders in conformity with a random number received from the random number generator.

4. A data processing device as claimed in claim 1, characterized in that there are provided storage means which cooperate with the sequencing means and in which the algorithm is stored in the form of a program which contains N program blocks as sub-algorithms containing program instructions as algorithm steps.

5. A data processing device as claimed in claim 1, characterized in that there is provided a wired logic circuit which cooperates with the sequencing means and contains the algorithm in wired and hence hardware form.

6. A data processing device as claimed in claim 1, characterized in that the data processing means are formed by means for the encryption and/or decryption of data.

7. A data processing device as claimed in claim 1, characterized in that the data processing device is formed by a data carrier whose circuit is constructed in integrated technology.

8. A circuit for a data device which circuit consists of various circuit sections which can be fed with a supply voltage via a configuration of conductors, and which circuit includes data processing means which constitute such a circuit section that can be fed with the supply voltage and are arranged to process data while utilizing a characteristic value, and also includes sequencing means which also constitute such a circuit section that can be fed with the supply voltage and are arranged to execute an algorithm in order to control the data processing means in conformity with this algorithm, which algorithm comprises a given number N of sub-algorithms which contain identical sequences of algorithm steps and can be executed in a given order each time when the algorithm is executed, and wherein, upon processing of data by means of the data processing means under the control of the sequencing means in conformity with the algorithm, the data processing causes a current peak pattern to occur at the area of the configuration of conductors, the pattern configuration of the current peak pattern being dependent on the algorithm steps on the processed data and on the characteristic value, characterized in that the circuit additionally includes order fixation means which co-operate with the sequencing means and whereby, upon each execution of the algorithm, an order can be fixed from a plurality of feasible orders for the execution of the N sub-algorithms.

9. A circuit as claimed in claim 8, characterized in that the order fixation means include a random number generator, and that by means of the order fixation means upon each execution of the algorithm, an order for the execution of the N sub-algorithms random number generated by the random number generator.

10. A circuit as claimed in claim 9, characterized in that the order fixation means additionally include order selection means which contain feasible orders for the execution of the N sub-algorithms and co-operate with the random number generator, and that the order selection means can select an order from the feasible orders in conformity with a random number received from the random number generator.

11. A circuit as claimed in claim 8, characterized in that there are provided storage means which co-operate with the sequencing means and in which the algorithm is stored in the form of a program which contains N program blocks as sub-algorithms containing instructions as algorithm steps.

12. A circuit as claimed in claim 8, characterized in that there is provided a wired logic circuit which co-operates with the sequencing means and contains the algorithm in wired and hence hardware form.

13. A circuit as claimed in claim 8, characterized in that the data processing means are formed by means for the encryption and/or decryption of data.

14. A circuit as claimed in claim 8, characterized in that the circuit is intended for a data processing device which is formed by a data carrier, and that the circuit is constructed in integrated technology.

* * * * *